United States Patent [19]

Sorbier

[11] 4,139,508

[45] Feb. 13, 1979

[54] PRODUCTS OBTAINED BY MOLDING LIGNEOUS MATERIALS AND THEIR METHOD OF MANUFACTURE

[76] Inventor: Pierre Sorbier, Place de la Mairie, 84210-Pernes les Fontaines, France

[21] Appl. No.: 730,172

[22] Filed: Oct. 7, 1976

[30] Foreign Application Priority Data

Oct. 8, 1975 [FR] France .................. 75 30849
Sep. 27, 1976 [FR] France .................. 76 28984

[51] Int. Cl.² ........................................... C08L 97/00
[52] U.S. Cl. ................................. 260/17.5; 264/137
[58] Field of Search ................... 260/17.5; 106/123

[56] References Cited

U.S. PATENT DOCUMENTS

| | | | |
|---|---|---|---|
| 2,988,536 | 6/1961 | Hine | 260/17.5 |
| 3,239,469 | 3/1966 | Bice | 260/17.5 |
| 3,919,127 | 11/1975 | Larsen | 260/17.5 |

*Primary Examiner*—Paul R. Michl
*Attorney, Agent, or Firm*—Cushman, Darby & Cushman

[57] ABSTRACT

A process for producing a heat-resistant object comprises drying fibrils of a ligneous material previously immersed in a boiling aqueous salt solution, said drying being continued until the moisture content thereof is about 10 percent, impregnating said dried fibrils with a solution of a polymerizable resin and pressure molding the resulting impregnated fibrils so as to polymerize said resin thereby producing said heat-resistant object.

13 Claims, 2 Drawing Figures

PRODUCTS OBTAINED BY MOLDING LIGNEOUS MATERIALS AND THEIR METHOD OF MANUFACTURE

The present invention has for its object novel products obtained by molding ligneous materials and their fabrication processes.

It is already known how to agglomerate by gluing, for example with synthetic resin, wood particles to make sheets or objects of various forms, but these products do not offer all the desired qualities and particularly they cannot be obtained in slight thicknesses.

The present invention aims more particularly at the fabrication of products or objects made with ligneous materials and which can in particular be in the form of thin walls having a thickness of some tenths of a millimeter or more, these products having the property of exhibiting a high resistance to heat and/or a particularly advantageous surface state.

These products can be intended particularly, and without thereby limiting the invention, for making containers for cooked foods particularly those that are preserved in the quick-frozen state, or making of disposable dishes.

The present invention has for its object a novel process for making heat-resistant objects, characterized by the fact that the process comprises drying fibrils of a ligneous material, previously immersed in an aqueous solution of a salt, particularly sodium chloride, which is preferably kept at the boil until the moisture content of the fibrils is reduced to about 10%, impregnating the fibrils with a solution of polymerizable resin and pressure molding of the thus impregnated product, thereby assuring polymerization of the resin.

The ligneous product is preferably formed into a mast for introduction into the mold.

In this way, there is obtained an object which can be of slight thicknesses, for example, going down to 3/10 mm and which has the feature of offering a high resistance to heat.

By fibrils of ligneous material, usable according to the invention, is meant mechanical wood pulp or ligneous bundles whose length is generally between about 5 and about 200 mm, the fibers of the bundles having a thickness less than 1/10 mm and a width less than 5/10 mm. A ligneous material of such bundles has a natural expansion from 60 to 80 times the volume of the final product according to the invention whose density is about 0.7. The ligneous material fibrils, of course, have different dimensions from one another.

It is also possible to use ligneous material fibrils whose sections are of great dimensions when it is desired to make objects with relatively large thicknesses.

According to a first embodiment of the invention, the ligneous material in the form of logs is previously immersed, after which the logs are reduced to mechanical pulp state by a standard process, for example, by friction on a grinder, or defibrillation is performed to obtain ligneous bundles having the characteristics described above.

According to a second embodiment the ligneous material, already in fibril form, is previously immersed.

To perform defibrillation of the wood logs to obtain ligneous bundles as defined above it is particularly advisable to use a device of which a non-limiting example is shown on the accompanying drawing in which.

This device comprises a disk-shaped plate 1, driven in rotation by a suitable mechanism (not shown) and resting on a plurality of rollers (also not shown).

This plate 1, preferably metal, comprises a plurality of orifces 2, each provided with metal wires 3, fastened, for example, by brazing at one of their ends to the inside face of plate 1 and protruding at a height, for example, of 2 mm from the upper face of the plate. These wires are, for example, steel wires, of the piano wire type, with a diameter of 15/10.

Plate 1 can have a diameter of about 1 m, each of orifices 2 having a diameter of 10 mm. Orifices 2 can be aligned along the radii of the plate and be staggered from one row to the next.

Figure 1:
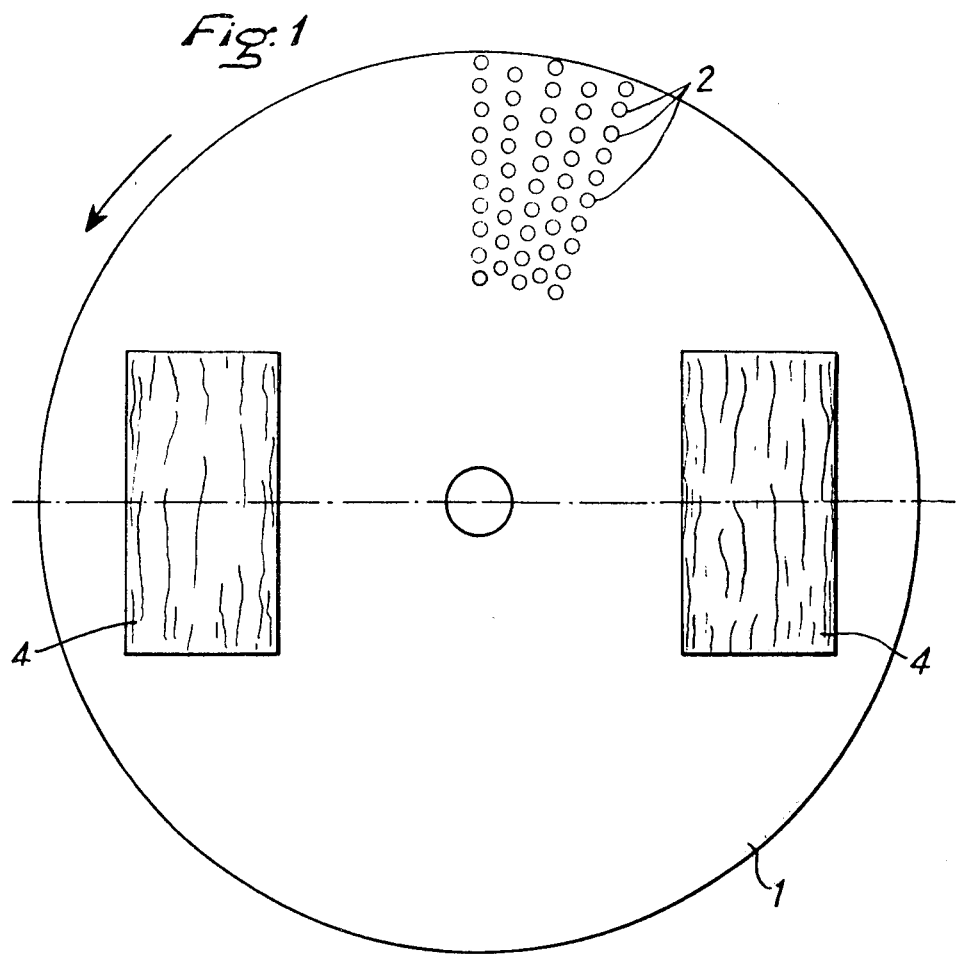
FIG. 1 represents a top view schematically.
Figure 2:
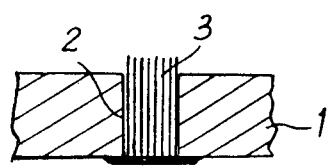
FIG. 2 represents a section on a larger scale of one of the orifices of the plate of the device.

To obtain ligneous bundles having the characteristics mentioned above, there are placed on plate 1 one or preferably two logs 4 of green wood or impregnated wood with the transverse axis of the log or logs placed approximately along a radius of the plate. These logs have a radius of preferably about 250 mm. It then suffices to make plate 1 rotate in the direction indicated by the arrow on FIG. 1 with a speed on the order of 20 to 50 m/s, by exerting optionally a pressure on the logs from above.

In a variant of the invention and although sodium chloride is preferred, improved heat resistance can be obtained by impregnating the ligneous material with other salts, such as, for example, ammonium chloride, sodium sulfate, or ammonium phosphate.

In a preferred embodiment of the invention, the polymerizable resin is made up of melamine which is applied to the ligneous material in the form of a hydroalcoholic solution of soluble melamine. The polymerization catalyst can be, for example, ammonium chloride. Melamine is particularly indicated for food uses.

It is also possible to employ other types of resins such as triazine, epoxide, phenol-formol, resorcin-formol, resorcin-phenol-formol, resorcin or again urea-formol with or without addition of melamine or resorcin, in particular when the product obtained is not for food use.

The present invention has for its object the novel industrial product consisting of an object made by the above process, characterized by the fact that it is obtained by agglomerating with a polymerizable resin a ligneous material impregnated with sodium chloride, the resulting object exhibiting a high resistance to heat, although it can be destroyed by incineration.

The present invention also has for its object a process of imparting to an object, obtained by molding a ligneous material, and particularly an object obtained by the process described above, the appearance of faience or porcelain, this process consisting in simultaneously spraying on the surface of said object an aqueous solution of resin such as soluble melamine containing a catalyst and bleached wood wool and/or bleached, dried paper pulp, then reintroducing the object into the mold, maintaining it under a moderately high pressure, at a temperature of about 120 to 150° C. for a time sufficient to polymerize the resin.

In a preferred embodiment there are obtained heat-resistant objects exhibiting a faience or porcelain appearance, by successively using the two procedures just described.

In a variant the bleached wood wool and/or bleached paper pulp is mixed with the resin impregnated ligneous material fibrils before molding which makes it possible to obtain the object according to the invention directly. In this case, it is also possible to use fibrils of a ligneous material that has been treated with a solution of sodium chloride as indicated above.

According to a particular embodiment, kaolin powder is mixed with the ligneous material fibrils or sprayed onto the surface of the premolded object.

Although soluble melamine is preferably used according to the invention, it is also possible to use other resins such as triazine, epoxide, phenol-formol, resorcin-formol, resorcin-phenol-formol, resorcin or again urea-formol, with or without addition of melamine or resorcin.

The present invention also has for its object the novel industrial product consisting of an object molded according to the process indicated above, characterized by the fact that it exhibits a hard, polished white surface and that it resists moisture and even boiling water.

For a better understanding of the invention, there will now be given, by way of non-limiting illustration, several embodiments described in the following examples.

EXAMPLE 1

A ligneous material is used in the form of ligneous bundles having a length between 5 and 200 mm, a thickness less than 1/10 mm and a width less that 0.5 mm. This ligneous material is immersed in an aqueous solution saturated with sodium chloride and brought to the boil.

The ligneous material is then dried by reducing its moisture content to about 10% and the material thus treated is impregnated with a solution made up of a mixture of the following weights:
 soluble melamine; 500 kg
 denatured alcohol; 100 kg
 water; 400 kg Impregnation is performed with a proportion of about 12% of dry extract of the melamine solution in relation to the total weight of the ligneous material in the dry state.

It is dried again to a residual moisture of about 10%, then the ligneous material is formed into a mast weighing between 600 and 1,500 g per m² depending on the thickness it is desired to impart to the resulting product.

The mast of ligneous material, impregnated with melamine, is molded between two shells under a pressure of about 20 kg/cm² and at a temperature of 100 to 150° C. for a period of about 10 seconds.

After removal from the mold, there is obtained an object such as a boatlike container for food products, having a thickness of about 3 to 8 tenths mm which has a marbled appearance with a hard, smooth, brilliant surface that is waterproof and resistant to a temperature of 250° C. for more than 20 minutes.

By prior dyeing of the ligneous material in its mass and of the impregnation solution, it is possible to obtain colored products and even multicolored products by mixing ligneous materials dyed different colors.

EXAMPLE 2

A dry ligneous material is used in the form of mechanical pulp which is impregnated with 12% by weight (based on dry extract) of a hydroalcoholic solution of soluble melamine, containing by weight:
 melamine; 60 kg
 denatured alcohol; 10 kg
 water; 30 kg The ligneous material thus impregnated is dried and formed into a mast weighing about 600 to 1,500 g per m² which is then molded between two shells of a press at a temperature of about 80 to 110° C. and under a pressure of about 20 kg/cm².

The object thus obtained, for example a plate, is subjected simultaneously to spraying with a hydroalcoholic solution of soluble melamine and a corresponding catalyst, containing by weight:
 melamine; 500 kg
 alcohol; 100 kg
 water; 400 kg
 catalyst (ammonium chloride); 0.5 to 3%
and to a projection of bleached wood wool and/or bleached, dried paper pulp.

Kaolin powder can be sprayed at the same time as the wood wool and/or paper pulp. It is also possible to dilute the kaolin powder in a melamine solution at a rate of 10 to 30% by weight of the solution.

After having been coated in this way with an opaque layer of about 100 g per m² the object is again introduced between the mold plates and is subjected to a temperature of about 100 to 150° C. and a pressure of 20 kg/cm² for about 10 seconds to polymerize the melamine.

In this way there is obtained an object exhibiting a wall that can be of slight thickness and which also exhibits the characteristics of having a white, brilliant and hard surface which can resist boiling water and moisture.

Obviously it is possible by dyeing the paper pulp or the wood wool and/or by use of a charge made up of a colored powder to obtain colored surfaces on the object in question.

EXAMPLE 3

By subjecting to the process according to example 2 a ligneous material that has been previously treated by immersion in an aqueous saturated sodium chloride solution at 100° C., an object is obtained which has a surface which both resembles faience or porcelain and has a high heat resistance.

In this embodiment, the kaolin powder can advantageously be kept in suspension in the saturated sodium chloride solution, for example, with a powder content of about 15%, which results in already bleaching the mass of ligneous material used and causing its surface mineralization which further improves the heat resistance of the material, while avoiding any yellowing.

EXAMPLE 4

Ligneous bundles, whose fibers have the dimensions defined in example 1 are made from soft wood logs, about 250 mm in length, immersed in a boiling aqueous saturated sodium chloride solution to which has been added 20 to 50% by weight of kaolin powder.

Defibrillation is performed as indicated above with reference to the accompanying drawing.

The fibrils made from the ligneous bundles are dried to about 10% moisture and then impregnated with a melamine solution having the following composition:
 soluble melamine; 50
 denatured alcohol; 10
 water; 40
 ammonium chloride (catalyst); 0.5 to 3%

This impregnation is made at a rate of 20 to 30% of dry extract of melamine solution relative to the weight of the dry ligneous material.

Then the material thus treated is sprayed with kaolin powder to saturation, and again dried to about 10% moisture.

The ligneous material is formed into a mast having a weight of about 600 to 1,500 g per m$^2$, and then molded at a pressure of 30 to 40 kg/cm$^2$ for 10 seconds at a temperature of about 110° to 150° C.

There is thus obtained, in a single molding, a material that has a white, smooth, hard surface which has the appearance of porcelain. This material resists a temperature of 250°. It also resists perfectly water, greases, bases and acids.

The objects according to the invention further exhibit the advantage of being able to be made by a non-polluting process since they are based on ligneous materials obtained by purely mechanical treatments, whereas the paper industry requires the intervention of chemical products which are generally discharged into the environment and which destroy a great amount of cellulose that becomes irrecoverable.

Further, the objects made according to the invention have the advantage of being able to be destroyed by simple incineration, without releasing harmful gas.

The products according to the invention can serve different uses. They can be in the form of plates. They can also be in the form of more elaborate objects such as, for example, boatlike containers intended for making cooked foods or disposable containers.

The boatlike containers according to the invention for cooked foods have many advantages relative to known boatlike containers. Actually, known boatlike containers which are often metallic, i.e., made of aluminum or aluminum alloy, have the drawback of being relatively expensive and are considered unaesthetic by the user.

An effort has also been made to make boatlike containers from plastic but these latter do not have sufficiently good heat resistance to be able to be used.

The boatlike containers for cooked foods, obtained according to the invention, offer the advantage of being totally harmless in regard to the food products they contain, of being sufficiently resistant to heat to be able to be introduced into ovens whose temperature is not rigorously controlled as that in the case of home ovens and of exhibiting a particularly aesthetic appearance which makes them resemble plates of faience or porcelain.

It is understood that the embodiments which were described above have no limiting character and they can receive any desirable modifications without thereby going outside the scope of the invention.

I claim:

1. A process for producing a heat-resistant object comprising
    (a) immersing a ligneous material in an aqueous salt solution,
    (b) drying the said ligneous material, in the form of fibrils until the moisture content thereof is about 10 percent,
    (c) impregnating said fibrils with a solution of a polymerizable resin, and
    (d) molding said resin impregnated fibrils under pressure to polymerize said resin thereby producing said heat-resistant object.

2. The process of claim 1 wherein said fibrils are impregnated with a hydroalcoholic solution of melamine.

3. The process of claim 1 wherein said ligneous material is immersed in an aqueous solution of sodium chloride.

4. The process of claim 3 wherein said aqueous solution of sodium chloride also includes kaolin.

5. The process of claim 1 wherein the aqueous salt solution in step (a) is at the boil.

6. The process of claim 1 which also includes subsequent to molding said resin impregnated fibrils in step (d), the steps of
    (e) spraying on the surface of the resulting molded object a catalyst-containing solution of a polymerizable resin and simultaneously with said spraying, projecting onto said surface bleached wood wool or bleached and dried paper pulp or a mixture thereof, and
    (f) molding said object resulting from step (e) under pressure and at a temperature of about 100° to 150° C. for a time sufficient to polymerize said resin, whereby said object is provided with the appearance of faience or porcelain.

7. The process of claim 6 wherein said catalyst is ammonium chloride.

8. A process for producing a molded object from ligneous material fibrils, said object having the appearance of faience or porcelain consisting essentially of
    (a) preparing an admixture consisting essentially of said ligneous material fibrils, a polymerizable resin in an amount effective to impregnate said ligneous material and an effective amount of bleached wood wool or bleached paper pulp or a mixture thereof and
    (b) molding the mixture resulting from step (a) so as to polymerize said resin.

9. The process of claim 8 wherein said resin is melamine.

10. The process of claim 8 wherein said ligneous material fibrils prior to being admixed in step (a) are immersed in an aqueous solution of sodium chloride.

11. The process of claim 10 wherein said aqueous solution of sodium chloride is at the boil.

12. The process of claim 8 which includes adding kaolin powder in step (a).

13. The process of claim 8 wherein the ligneous material fibrils in step (a) are in the form of ligneous bundles having a length between 5 and 20 mm, a thickness less than 0.1 mm and a width less than 0.5 mm.

* * * * *